United States Patent
Matsumoto

(10) Patent No.: US 6,904,532 B2
(45) Date of Patent: Jun. 7, 2005

(54) PORTABLE ELECTRONIC DEVICE

(75) Inventor: Katsuyuki Matsumoto, Hirakata (JP)

(73) Assignees: Sanyo Electric Co., Ltd., Moriguchi (JP); Sanyo Technosound Co., Ltd., Daito (JP)

(*) Notice: Subject to any disclaimer, the term of this patent is extended or adjusted under 35 U.S.C. 154(b) by 293 days.

(21) Appl. No.: 09/745,667

(22) Filed: Dec. 26, 2000

(65) Prior Publication Data

US 2001/0006884 A1 Jul. 5, 2001

(30) Foreign Application Priority Data

Dec. 27, 1999 (JP) ............................................. 11-370328

(51) Int. Cl.[7] ............................................... G06F 1/32
(52) U.S. Cl. ..................... 713/320; 713/300; 713/340; 700/297
(58) Field of Search ................................ 700/300, 320, 700/340, 286, 295, 297; 713/300, 320, 340; 327/544

(56) References Cited

U.S. PATENT DOCUMENTS

| | | | |
|---|---|---|---|
| 5,446,905 A | 8/1995 | Koshiishi | 395/750 |
| 5,650,669 A | 7/1997 | Aldous | 307/66 |
| 5,764,502 A * | 6/1998 | Morgan et al. | 363/65 |
| 6,003,138 A | 12/1999 | Chung | 713/300 |
| 6,178,514 B1 * | 1/2001 | Wood | 713/300 |
| 6,338,143 B1 * | 1/2002 | Shimazaki | 713/340 |
| 6,459,175 B1 * | 10/2002 | Potega | 307/149 |

FOREIGN PATENT DOCUMENTS

| | | |
|---|---|---|
| EP | 0 472 261 | 2/1992 |
| EP | 0 551 080 | 7/1993 |

OTHER PUBLICATIONS

Copy of European Search Report for corresponding European Patent Application No. 00 12 8281 dated Apr. 2, 2001.

* cited by examiner

Primary Examiner—Leo Picard
Assistant Examiner—Charles Kasenge
(74) Attorney, Agent, or Firm—Armstrong, Kratz, Quintos, Hanson & Brooks, LLP

(57) ABSTRACT

A portable electronic device including a USB connector, an internal power source, a USB controller to execute data communication processing for data communication with a personal computer connected to the USB connector, a main CPU to execute device operation processing for usual operation of the device. When the USB controller executes data communication processing, the device is supplied with power at high voltage from the personal computer through the USB connector. When the main CPU executes device operation processing, the device is supplied with power at low voltage from the internal power source. Accordingly, this makes not only high speed data communication available, but also prolongs the life of the internal power source.

4 Claims, 1 Drawing Sheet

PORTABLE ELECTRONIC DEVICE

BACKGROUND OF THE INVENTION

1. Field of the Invention

The present invention relates to portable electronic devices such as audio players and digital cameras of the portable type, and more particularly to portable electronic devices having two power supply systems from an external power source and that from an internal power source.

2. Description of the Related art

Portable electronic devices such as audio players or digital cameras of the portable type conventionally have incorporated therein a dry battery or secondary battery serving as the power source to realize the portability of the device. The devices are adapted to be connected to external power sources such as commercial alternating power source, etc., for charging the secondary batteries.

In recent years, the USB (Universal Serial Bus) has attracted attention as a universal interface for connecting a plurality of peripheral devices in common to a host computer. The USB connector, which is compliant with the USB standard, comprises a pair of data terminals D+ and D−, a power source terminal, and a grounding terminal. It can provide high speed data communication using data terminals D+ and D−, and can be used for supplying power by way of the power source terminal. Accordingly, a method is studied that a portable electronic device is provided with a USB connector and the connector is, for example, connected to a personal computer to supply power to the device.

It is usual practice with the portable electronic device (compliant with the USB standard) having the USB connector to provide a main CPU for executing predetermined device operation processing for various operations of the device including reproduction of data, and a USB controller separate from the main CPU and adapted to execute predetermined data processing for carrying out data communication with the personal computer through the USB connector so as to ensure simplified processing.

When the USB compliant device, for example, downloads the compressed audio data from a personal computer to store the data on the memory card incorporated therein, and thereafter to read the data stored in the memory card to reproduce the data, the audio data is read out from the memory card with the data processing executed at about 128 Kbps, which is a relatively low speed. On the other hand, when the audio data is downloaded from the personal computer through the USB connector, the audio data which records sound for an hour is about 64 MB even if the data is compressed. If the transferring speed of 12 MbPSA, which is theoretical value of the USB, is drawn out to a maximum limit, it is necessary to take 40 seconds or more in transferring the data. Thus, because the data needs to be transferred as fast as possible, power source voltage of the IC for executing the data transferring should be set as high as possible.

The applicants have developed a portable electronic device wherein one chip IC conducts the control of write/read of the data to the memory card and the processing of data transfer (USB transfer) through a USB connector. With the IC provided with the portable electronic device, while the supply of the power source voltage greater than 2.7 V makes it possible to read the data from the memory card, the power source voltage greater than 3.0 V should be provided in order to realize high speed data transferring.

However, in the case where the USB connector is not connected to the personal computer to reproduce the data using internal power source including a dry battery, a secondary battery and the like, the internal power source is discharged with high voltage of greater than 3.0 V as described above. This entails the problem of shortening the life of the internal power source. Although the power source voltage is reduced to 2.7 V to prolong the life of the internal power source, the USB transferring speed is declined.

SUMMARY OF THE INVENTION

An object of the present invention is to provide a portable electronic device which is capable of high speed data communication, and is further adapted to prolong the life of the internal power source.

The portable electronic device of the present invention comprises a power source terminal for connecting an external power source, an internal power source having lower voltage than the external power source, first circuit means for executing first data processing, and second circuit means for executing second data processing which is lower in speed than the first data processing. Power is supplied by the external power source through a power source terminal when the first circuit means is operated, and power is supplied by the internal power source when the second circuit means is operated. The internal power source is formed by a dry battery or a secondary battery.

With the portable electronic device of the present invention, when the first circuit means is operated, the power source terminal is connected to the external power source to give the device high voltage of the power source through the power source terminal. This realizes high speed data processing. On the other hand, when the second circuit means is operated, the device is given low voltage of the power source through the internal power source, so that the data processing speed becomes lower. The speed is, though, sufficient to reproduce the audio data and the like, or rather setting of the lower voltage of the power source allows the internal power source to prolong its life.

Stated more specifically, the portable electronic device is a USB compliant device which has a USB connector, compliant with the USB standard, and one of terminals of the USB connector is the power source terminal. With the specific construction, the USB connector is connected to a personal computer to give the device high voltage of the power source from the personal computer realizing high-speed USB transferring with the personal computer.

Further stated specifically, the first circuit means is provided by a data communication controller for executing predetermined data communication processing to conduct data communication with an external information processing device, and the second circuit means is provided by a control circuit for executing device operation processing for the usual device operation connected to the data communication controller. With this specific construction, the data communication controller is supplied with high voltage of the power source to realize high speed data communication processing. When the device is operated by the control circuit, low voltage of the power source allows the internal power source to prolong its life.

With another further specific construction, a first power supplying wire extends from the power supply terminal, and a second power supplying wire extends from the internal power supply source. Reverse flow resist means is provided on the wires, respectively, each end of the wires is interconnected, and the interconnected point is connected to the first circuit means and the second circuit means. With the specific construction, the external power source is connected to the power source terminal, so that the voltage impressed to the first wire is higher than the second wire. Accordingly, power is supplied from the external power source through the first wire and the connected point to the first circuit means and the second circuit means. On the other hand, when the external power source is cut off from the power source terminal, the voltage impressed to the first wire falls to zero to supply power from the internal power source through the second wire and the connected point to the first circuit means and the second circuit means.

As described above, the portable electronic device of the present invention adopts a method in which the two power supplying systems of a high voltage power supplying system from the external power source and a low voltage power supplying system from the internal power source are changed over according to the content of the data processing. Thus, the internal power source life can be prolonged while the device makes high speed data communication possible.

DETAILED DESCRIPTION OF THE PREFERRED EMBODIMENTS

Figure 1:
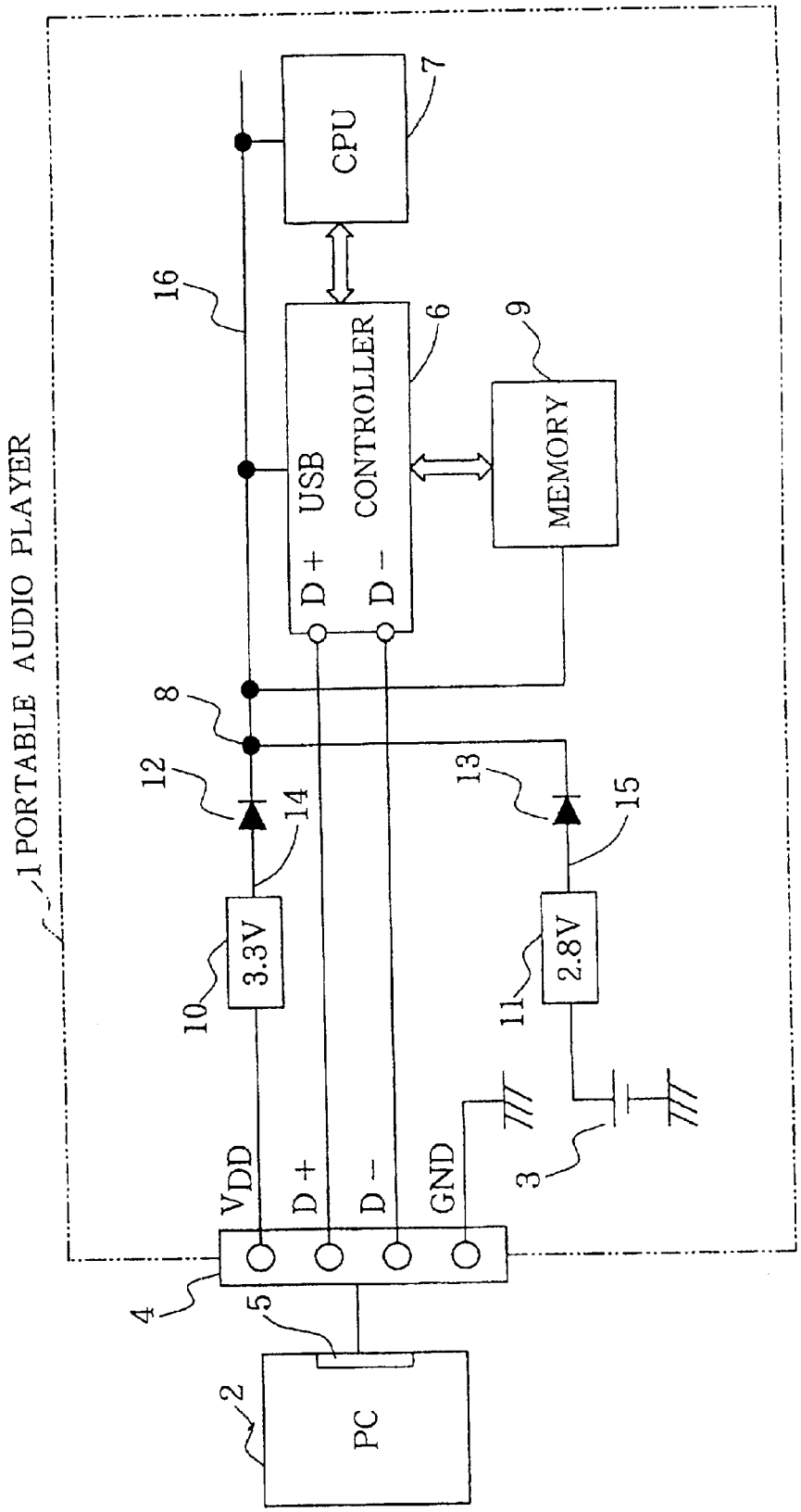
FIG. 1 is a block diagram showing the construction of a portable audio player embodying the present invention.

A portable audio player embodying the present invention will be described below in detail with reference to FIG. 1. A portable audio player 1 embodying the invention, as shown in the drawing, comprises a USB connector 4 connectable to a USB connector 5 of a host personal computer 2 through a USB cable. The USB connector 4 has a pair of data terminals D+ and D−, a power source terminal $V_{DD}$, and a grounding terminal GND.

The audio player 1 is provided with a USB controller 6 to execute predetermined data communication processing for performing data communication with the personal computer 2 through the connector 4, a main CPU 7 to execute predetermined device operation processing for various operations of the device including reproduction of data, a memory 9 constructed by a Multi Media Card and the like, an internal power source 3 constructed by a secondary or a dry battery. The connection of the connector 4 to the personal computer 2 applies the power source voltage of 5 V to the power source terminal $V_{DD}$ of the connector 4.

The pair of data terminals D+ and D− of the USB connector 4 are connected to a pair of data terminals D+ and D− provided on the USB controller 6. The grounding terminal GND is grounded.

A first power supplying wire 14 extends from the power source terminal $V_{DD}$ of the connector 4, and a first voltage regulator 10 and a first diode 12 are provided on the wire 14. This adjusts the power source voltage of 5 V obtained from the terminal $V_{DD}$ of the connector 4 to 3.3 V. A second power supplying wire 15 extends from the internal power source 3, and a second voltage regulator 11 and a second diode 13 are provided on the wire 15. This adjusts the power source voltage of 3 V obtained from the internal power source 3 to 2.8 V.

Each end of the first wire 14 and second wire 15 is interconnected. A third power supplying wire 16 extending from the interconnected point 8 is connected to the USB controller 6, the main CPU 7, and the memory 9 to supply power.

When the audio player 1 downloads audio data from the personal computer 2 with the connector 4 connected to the computer 2, the computer 2 applies the power source voltage of 5 V to the terminal $V_{DD}$ of the connector 4, so that the voltage (about 3.3 V) obtained at an output end of the first diode 12 of the first wire 14 is greater than the voltage (about 2.8 V) obtained at an output end of the second diode 12 of the second wire 15. Consequently, the power from the terminal $V_{DD}$ of the connector 4 is supplied to the controller 6, the CPU 7, and the memory 9 through the first wire 14, the interconnected point 8, and the third wire 16.

As a result, USB control function of the USB controller 6 is activated, causing the controller 6 to download the audio data from the personal computer 2, activating memory control function of the controller 6, storing the downloaded data to the memory 9.

When the computer 2 is thereafter cut off from the connector 4, reading out the audio data stored in the memory 9, to reproduce sound, the cut off from the computer 2 reduces the voltage applied to the first wire 14 to zero. Accordingly, the power of the internal power source 3 is supplied to the controller 6, the CPU 7, and the memory 9 through the second wire 15, the interconnected point 8, and the third wire 16.

Thus, while the memory control function of the controller 6 is activated to read out the audio data stored in the memory 9, reproduction control function of the CPU 7 is activated to reproduce the read data as sound.

As described above, in the case where the audio player 1 embodying the invention downloads or uploads the audio data with the connector 4 connected to the computer 2, the high power source voltage supplied by the computer 2 realizes high speed data communication. When the audio data is reproduced with the connector 4 cut off from the computer 2, power is supplied by the low power source voltage from the internal power source, so that the life of the dry or secondary battery can be prolonged providing the internal power source 3.

The present invention is not limited to the foregoing embodiment in construction but can be modified variously by one skilled in the art without departing from the spirit of the invention as set forth in the appended claims. For example, the invention can be practiced not only for digital audio players but also for digital video devices such as digital cameras, etc.

What is claimed is:

1. A portable electronic device comprising a power source terminal for connecting to an external power source providing a D.C. voltage not greater than 5 volts, an internal power source which has the D.C. voltage less than a D.C. voltage provided by the external power source, first circuit means to execute first data processing, and second circuit means to execute second data processing which has lower speed than the first data processing, wherein the external power source connected to a USB connector supplies power to the device through a power source terminal of the USB connector when the first circuit means is in an active mode, and the internal power source supplies power to the device when the second circuit means is in the active mode.

2. A portable electronic device according to claim 1 wherein the internal power source is a dry battery or a secondary battery.

3. A portable electronic device according to claim 1 wherein the first circuit means is provided by a data communication controller to execute predetermined data communication processing for performing data communication with an external information processing device, and the second circuit means is provided by a control circuit to execute device operation processing for usual operation of the device.

4. A portable electronic device according to claim 1 wherein a first power supplying wire extends from the power source terminal, and a second power supplying wire extends from the internal power source, reverse flow resist means is provided on each of the two power supplying wires, each end of the two power supplying wires is interconnected, and the interconnected point is connected to the first circuit means and the second circuit means.

* * * * *